United States Patent
Neumann

(10) Patent No.: US 10,548,203 B2
(45) Date of Patent: Jan. 28, 2020

(54) METHOD AND DEVICE FOR BIDIRECTIONAL COMMUNICATION

(71) Applicant: Inova Semiconductors GmbH, München (DE)

(72) Inventor: Roland Neumann, München (DE)

(73) Assignee: Inova Semiconductors GmbH, München (DE)

( * ) Notice: Subject to any disclaimer, the term of this patent is extended or adjusted under 35 U.S.C. 154(b) by 0 days.

(21) Appl. No.: 16/087,534

(22) PCT Filed: Jan. 26, 2017

(86) PCT No.: PCT/EP2017/000093
§ 371 (c)(1),
(2) Date: Sep. 21, 2018

(87) PCT Pub. No.: WO2017/162324
PCT Pub. Date: Sep. 28, 2017

(65) Prior Publication Data
US 2019/0110350 A1   Apr. 11, 2019

(30) Foreign Application Priority Data
Mar. 21, 2016  (DE) .......................... 10 2016 105 263

(51) Int. Cl.
*H05B 37/02* (2006.01)
*H04L 1/16* (2006.01)
(Continued)

(52) U.S. Cl.
CPC ....... *H05B 37/0254* (2013.01); *H04L 1/1671* (2013.01); *H04L 12/40169* (2013.01); *H05B 33/0857* (2013.01)

(58) Field of Classification Search
CPC .. H05B 37/02; H05B 37/029; H05B 37/0254; H05B 33/0857; H05B 33/086;
(Continued)

(56) References Cited

U.S. PATENT DOCUMENTS 7,139,617 B1* 11/2006 Morgan ............... H05B 37/029
                                                         700/17
8,491,159 B2*  7/2013 Recker ................... H02J 7/025
                                                         362/276
(Continued)

FOREIGN PATENT DOCUMENTS

DE     202013103146       10/2014
WO     WO-2013095133 A1    6/2013
WO     WO-2017162324 A1    9/2017

OTHER PUBLICATIONS

"International Application No. PCT/EP2017/000093, English Translation of International Preliminary Report on Patentability dated Jul. 4, 2018", (dated Jul. 4, 2018), 32 pgs.

(Continued)

*Primary Examiner* — Haissa Philogene
(74) *Attorney, Agent, or Firm* — Schwegman Lundberg & Woessner, P.A.

(57) ABSTRACT

The present invention is directed to a method for bidirectional communication between a command unit and a plurality of LED control units connected thereto. In accordance with the invention, it is possible to supply control commands to LED control units with high speed, or to return execution results from these control units to a command unit. Therefore, the present invention provides for a highly efficient and thus highly performant method for communication between several serially connected control units. Furthermore, the invention is directed to a respective device for bidirectional
(Continued)

Figure 1:
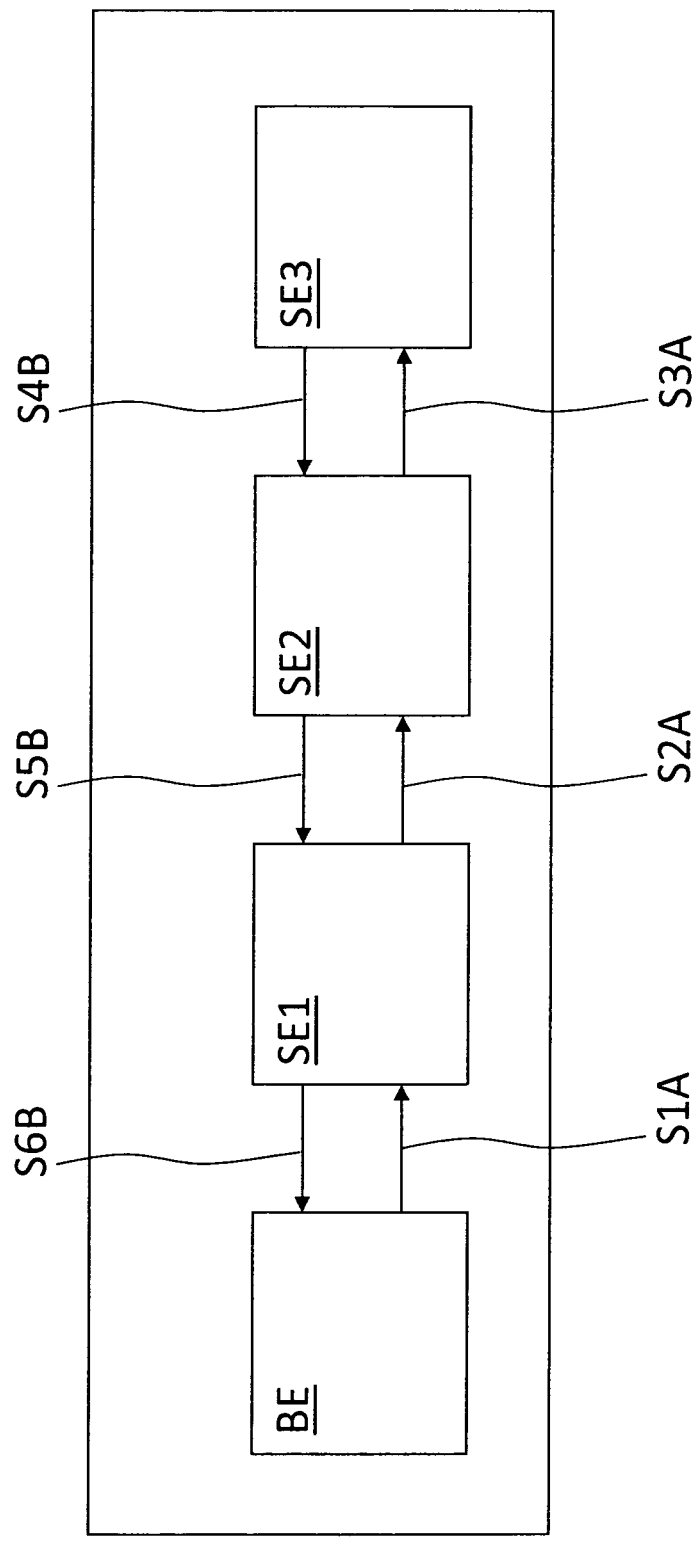

communication as well as a computer program product including control commands for implementation of the method.

11 Claims, 4 Drawing Sheets

(51) Int. Cl.
    *H04L 12/40*     (2006.01)
    *H05B 33/08*     (2006.01)

(58) Field of Classification Search
    CPC ............. H04L 12/403; H04L 12/40169; H04L 12/40195; H04L 1/1671
    See application file for complete search history.

(56) References Cited

U.S. PATENT DOCUMENTS

| | | | |
|---|---|---|---|
| 8,492,983 B1 | 7/2013 | Berg et al. | |
| 10,102,177 B2* | 10/2018 | Yoshida | G06F 13/4282 |
| 2009/0021955 A1 | 1/2009 | Kuang et al. | |
| 2014/0333207 A1 | 11/2014 | Saes | |
| 2019/0053339 A1* | 2/2019 | Neumann | H04L 12/403 |

OTHER PUBLICATIONS

"International Application No. PCT/EP2017/000093, International Search Report and Written Opinion dated May 11, 2017", (dated May 11, 2017), 12 pgs.

* cited by examiner

METHOD AND DEVICE FOR BIDIRECTIONAL COMMUNICATION

PRIORITY CLAIM TO RELATED APPLICATIONS

This application is a U.S. national stage filing under 35 U.S.C. § 371 from International Application No. PCT/EP2017/000093, filed on 26 Jan. 2017, and published as WO2017/162324 on 28 Sep. 2017, which claims the benefit under 35 U.S.C. 119 to German Application No. 10 2016 105 263.9, filed on 21 Mar. 2016, the benefit of priority of each of which is claimed herein, and which applications and publication are hereby incorporated herein by reference in their entirety.

The present invention is directed to a method for bidirectional communication between a command unit and a plurality of LED control units connected thereto. In accordance with the invention, it is possible to supply control commands to several serially connected LED control units with high speed, or to return execution results from these control units to the command unit. Therefore, the present invention provides for a highly efficient and thus highly performant method for communication between several serially connected control units. Furthermore, the invention is directed to a respective device for bidirectional communication as well as a computer program product including control commands for implementation of the method.

U.S. 2014/0333207 A1 shows an arrangement of light emitting diodes with, which are put in series using the known daisy-chaining method and hereby exchange status information.

U.S. Pat. No. 8,492,983 B1 shows a system for controlling light emitting diodes using a serial bus. Herein reception of an address field and amending the address field is suggested.

U.S. 2009/0021955 A1 shows a vehicle with a lighting arrangement with light emitting diodes including a respective controlling.

WO 2013/095133 shows an arrangement of light emitting diodes with, which are put in series using the known daisy-chaining method and hereby exchange status information.

DE 20 2013 103 146 U1 shows a system of devices with devices for distributed arrangement along emergency routes.

According to commonly known methods, a plurality of possibilities for addressing serially connected control units is known. Here, generic approaches, which approaches can be disadvantageous for specific application scenarios, or also very particular approaches exist, which approaches are no longer applicable in a generic manner. As an example, the so called CAN-Bus is known, which has been developed in regard to wiring harnesses and which specifically is meant to implement a network of control devices. The CAN-Bus provides a large number of components and requires a plurality of safety mechanisms which secure that no transmission error occurs. Furthermore, a plurality of data transmissions is necessary for securing the data integrity. Therefore, a number of measures is adopted which, in turn, demand computing resources and bandwidth.

Further, the so called LIN-Bus, i.e. Local Interconnect Network Bus is known, which also has been developed for serial communication systems and specifically for cross linking of sensors and control units. With the LIN-Bus, a generic approach has been implemented, which is usually not applied for broadband application scenarios. Moreover, according to the LIN-Bus, a comprehensive error management also has to be carried out. For example, checksums are calculated and signals identified to be erroneous are dismissed. In this case, signaling an error is not part of the protocol but must be defined in a further application layer, if necessary.

Furthermore, a series of communication protocols is known, which initiate data transmission in a communication network. Here, usually a central unit is formed, which regulates the data traffic. However, this prior art does not provide for a serial connection of a plurality of further control units such that these serially connected control units do not assume communication management but merely implement received commands. It is an advantage of serially connected control units that they do not have to control the coordination of network communication but can receive the same control commands from a control unit, have to merely implement these control commands and can pass them on.

Accordingly, the prior art teaches only methods which may enable serial data communication but implement the same with an unfavorable ratio of signaling data to payload and, thus, generate unnecessary overhead. These methods are either implemented specifically for an application scenario and are, thus, hardly transferable, or are so generic that an application with LED control units is disadvantageous. Furthermore, known methods show the disadvantage that they entail a high technical effort since control commands have to be executed in part redundantly in several network hubs. Accordingly, the provision of several command units for coordination of communication constitutes a disadvantage.

Accordingly, it is an object of the present invention to provide a method or a device which allow communication with LED control units with high speed and low technical effort. The technical effort is to be minimized in that both the single control units must be equipped with as less hardware resources as possible and the data transmitted across the network segments should be held to a minimum. Further, it is an object of the present invention to provide a computer program product which stores method steps for executing the proposed method by means of command instructions.

The object is achieved by a method for bidirectional communication according to the features of the main claim. Further advantageous developments are defined in the dependent claims.

Accordingly, a method for bidirectional communication between a command unit and a serially and electrically connected plurality of LED control units is proposed. The method comprises a transmission of a control command from the command unit to the connected LED control unit as well as an execution of the transmitted control command in the LED control unit and passing the control command on to the next connected LED control unit which did not transmit the control command, iteratively in a way that each LED control unit executes the control command. Further, in accordance with the invention, a respective return of an execution result of the control command is effected, starting from the last serially connected LED control unit to the respective previous unit, wherein each of the plurality of LED control units attaches its execution result to the received execution result in an iterative way such that the control unit receives the execution results of each LED control unit.

The method for bidirectional communication provides for a bidirectional communication in a way such that the direction of communication is bidirectional in a logical manner. This means that sending and receiving on a data segment does not have to be simultaneously possible at each point in time. In particular, by bidirectional, a timely delayed sending and receiving on the data segments, i.e. the data line, is provided. Accordingly, it is an aspect of the present invention that also communication segments can be blocked in at least one direction of communication at a time unit. Here, the command unit exists as a central component which actively causes communication between said command unit and the plurality of LED control units serially connected thereto. Accordingly, in the command unit according to an aspect of the invention, a logic is implemented that causes a communication process and initially initializes the same by means of a transmission of a respective message to the first connected LED control unit. Here, the command unit can access a memory which holds, for example, a communication protocol or at least single control commands which are transmitted to the first connected LED control unit. For example, the command unit can be implemented as a microcontroller.

The bidirectional communication can be carried out using a topology which provides that the command unit is arranged at the beginning of a serially and electrically connected plurality of LED control units. Accordingly, exactly one LED control unit is connected to the command unit. Here, a connection is usually effected by means of a communicative coupling of the first LED control unit to the command unit. Electrically connected in accordance with one aspect of the present invention has the particular meaning that the command unit is configured such that, for example, it transmits electrical signals by means of a communication segment of a data line to the first LED control unit. In that a plurality of LED control units is serially connected to the command unit, one LED control unit of the plurality of LED control units is connected to the command unit and, again, a further LED control unit is connected to this LED control unit. Accordingly, it is the result that the command unit comprises exactly one output or one input directed to the first LED control unit. Thus, each of the LED control units has two communication neighbors, provided that it is not the last LED control unit. An example of such a topology can be gathered, inter alia, from FIGS. 1 and 2.

Accordingly, a transmission of a control command from the command unit to the connected LED control unit can be carried out. The connected LED control unit is exactly the control unit that constitutes the first control unit of the series. Since the LED control units are connected with the command unit in a chain-like manner, i.e. connected in series, this particular connected LED control unit is directly connected to the command unit, while all further LED control units are coupled to the command unit in an indirect manner. According to an aspect of the present invention, a transmission of a control command is carried out in such a way that the command unit causes an electrical impulse which is transmitted electrically to the LED control unit by means of a data line or a segment of the data line.

Here, a control command can comprise at least one instruction as well as further parameters. For example, a control command can exist in the form of an instruction to all of the LED control units. Here, it is also possible that the control command does not have to be executed directly by the LED control units, but that they merely have to implement an execution of a control command. In this way, further units can be connected to the LED control units, such as sensor units, to which this transmitted control command is addressed. Here, the skilled practitioner is aware of further possibilities for implementing a control command. Also, the transmission of a control command can include further steps, such as preparatory steps. Accordingly, it is possible that, at first, the control command has to be generated in the command unit. For example, this can be carried out by means of read-out of the control command from a memory, or the command unit receives the control command from a further connected component. Also, the transmitted control command can be dependent on an already received execution result of the method according to the invention. That way, a series of control commands can exist, wherein, then again, the control command which is assigned to a particular execution result is transmitted. Thus, this results in an iterative transmission of a control command, a receipt of an execution result as well as a generation of a further control command depending on the received execution result.

After the transmission of the control command, the control command is executed in the LED control unit. Thus, a control command is received and is executed with as less further intermediate steps as possible. For example, an immediate execution of the control command can be carried out. Here, an immediate execution of the control command defines an implementation which does not require any further interpretation of the control command. Also, according to the invention, it is possible to omit further intermediate steps, for example a buffering of the control command. Thus, it is possible to immediately delete the control command after execution and passing-on of the control command.

For example, an execution of the transmitted control command can be carried out in that the LED control unit directly controls at least one LED, i.e. a light-emitting diode. Here, it is possible that the LED control unit initiates a functionality which is executed by the LED. In particular, an adjustment of the brightness and/or an adjustment of a color value of the LED is possible. Further, it is possible that one LED control unit exactly controls one light-emitting diode, or that one LED control unit controls a plurality of light-emitting diode units. In particular, the LED control unit can be intended for providing a certain color value by interaction of the plurality of light-emitting diode units. Furthermore, also only one single value of a light-emitting diode can be adjusted, wherein further LED control units adjust further values of respective further light-emitting diodes in a way such that a mixing ratio of the single light-emitting diode units results in the emission of a particular color value. Thus, by means of one or several LED control units, a certain color value and/or a certain brightness can be achieved.

For example, a passing-on of the control command can be carried out in a way such that the LED control unit which received the control command passes the same immediately on to the next connected LED control unit. Here, the passing-on implies that as less further processing steps regarding the control command as possible are to be carried out. That way, the serially and electrically connected LED control units are configured such that they receive, execute and directly pass the control command on. In particular, no further modification of the control command is to be carried out. This makes a highly efficient communication possible, in a way such that the control command is passed on from the single units to one of the neighboring units unmodified or at least substantially unmodified. Thus, in accordance with the present invention, it is typically not necessary to adapt the control command in regard to an address information. For example, it is possible to pass the control command on already before the execution of the control command or during the execution of the control command. Accordingly, in line with the invention, it is not necessary to wait for a full processing of the control command in an LED control unit. The control command can rather be passed on immediately after its receipt, wherein the same is only to be existent in the LED control unit in a ways such that an execution thereof is possible. Further, this enables a dismissal of the control command immediately after its execution.

The next connected LED control unit is the respective neighboring LED control unit from which the control command has not been transmitted. Due to the arrangement of the LED control units which provides for a series or a chain, each LED control unit has exactly two communication neighbors, except for the last LED control unit. The first LED control unit connected in series has a first neighbor, namely the command unit, and a second neighbor, namely a further LED control unit. The LED control units connected thereto comprise exactly two LED control units as respective neighbors. The last LED control unit of the series, however, has only one neighbor. Accordingly, a certain order is defined in the series in such a way that a transmission of the control command from the command unit to the last LED control unit is carried out by means of the single LED control units.

Thus, in between the units, there is always a sending unit and a receiving unit. This also implies a direction of communication of the line segments which connect the units.

Each of the LED control units is configured for execution and further transmission of the control command. An actual execution is carried out in each of the LED control units, wherein the last LED control unit executes the control command, but does not pass the same on. In general, all of the LED control units are structurally constructed identical, wherein a passing-on of the control command from the respective last LED control unit is not carried out, since the same does not have a receiving communication neighbor. That way, a passing-through of the control command through each of the units is carried out, which is iteratively repeated until the control command is present in each of the LED control units. Thus, an execution of the transmitted control command as well as a transmission of the same are carried out in an iterative manner. With each execution of the control command, an execution result is generated. For example, an execution result can exist in the form of a parameter which is the result of a calculation, or, alternatively, as a status information which merely describes the fact that a control command has been executed.

After an execution of the control command has been carried out in each of the LED control units, a return of the execution result is carried out. This occurs not before the control command has been fully processed in all of the LED control units. This is the case since it is started with the last LED control unit connected in series. Figuratively speaking, a passing-on of the control commands in accordance with an example is carried out from the left to the right and, in case the control command has arrived at the right side, a return of the respective execution results is carried out from the right to the left. Here, the execution result is passed on to the respective previous LED control unit. The single exception is the receipt of all execution results by the command unit, wherein the first LED control unit connected in series passes the execution results on to the command unit.

That way, a return is carried out to the respective previous unit, usually an LED control unit, but also a singular passing-on to the command unit.

Since the last serially connected LED control unit starts with the return of its result of the execution of the control command, there are no execution results to be attached to its execution result exist. Thus, the last serially connected LED control unit initializes the return of the execution result and transmits its execution result to the last but one LED control unit. Since a receipt of the execution result in the last LED control unit fails to appear, here the attachment of an execution result corresponds to the initialization of a return value. Each of the LED control units receives the previous execution result and attaches the own execution result thereto in a communicative manner. Thus, an adding-up or concatenation of the single execution results is carried out and they are passed on to a communication partner. This is carried out in such an iterative way that all execution results exist in a linked manner and can be returned to the command unit in a last method step. Thus, in accordance with the present invention, it is possible that the execution result to be returned is actually shorter in the beginning than the end result which is returned to the LED control unit. This circumstance is particularly advantageous for series with few units since, herein, the returned execution results are small compared to common methods. Here, the single units are structured in such an efficient way that, in turn, no storing of an execution result is necessary due to the fact that the execution results are received, added up and passed on. This again results to a performant communication between the communication partners.

According to the present invention, it is particularly advantageous that the execution of the control commands can already be parallelized. Thus, computing operations can be carried out in a first LED control unit and in a second LED control unit, while the control command is passed on to all further LED control units. This is the case, since an execution of the control command before being passed on has not to be awaited. Therefore, according to the present invention, it is possible to execute the control commands in all LED control units in parallel in the case that they are passed on immediately after their receipt. Thus, the presently proposed method is significantly more efficient that commonly known methods.

In accordance with an aspect of the present invention, an execution result comprises at least one return value of a plurality of return values, the group comprising a measurement value, a calculation result and a status information. This provides the advantage that an execution result can be generated in accordance with different calculation operations, and that the execution result can be generated depending on the control command pursuant to different application scenarios. Furthermore, in accordance with the present invention, it is possible that merely short execution results can be returned. For example, one status information can be one single Bit or one single communication signal.

In accordance with a further aspect of the present invention, the control command includes several instructions. This provides the advantage that a combined control command is enabled which causes several calculations in the respective LED control unit, or also that partial instructions can be passed on to further connected components. Furthermore, it is possible that the control command can be divided into header data and payload, such that an address information together with instructions can be transmitted.

In accordance with another aspect of the present invention, the LED control units are connected serially in pairs by means of a respective data line segment of a data line. This provides the advantage that a data line exists which is divided in such a way that two LED control units, respectively, or the command unit and one LED control unit are communicatively connected. Here, the data line provides a communicative coupling between two single units in logical manner. The data line can be physically implemented as single data line segments, wherein all units are connected in pairs. The data line segments can also constitute segments of a complete data line, i.e. a bus system, which secures the communication. A serial connection of the units is carried out in a way such that only the respective outer units comprise one communication partner and such that the respective inner units comprise two communication partners. A serial connection of units can also be described as a chaining or interlinking of units.

According to yet another aspect of the present invention, the data line segments are unidirectional and adjustable in regard to their direction of communication. This provides the advantage that a high bandwidth can be realized, since data line segments always only send or receive in one direction. That way, in accordance with the present invention, it is possible to cause an adjustment of a direction of a data line or of the segment of the data line. This can be carried out in such a way that the two units which are connected to the data line segment are either switched to sending/receiving or to receiving/sending. Thus, the connected units are either set up to receive on one data line segment or to send on one data line segment. That way, a direction of the data line segment can be defined. Although physical data lines typically can send and receive in both directions, it is advantageous in accordance with the present invention due to an increase in efficiency that, on one data line segment, only sending or receiving is possible. In accordance with the present description, such feature is described as unidirectional. Thus, in accordance with the present invention, it is also possible to adjust the direction of communication. This provides the advantage that the occurrence of errors on a receiving line can be minimized. Thus, the method as proposed herein is less prone to error, which again results in a minimizing of the technical effort. That way, compared to commonly known methods, less error-correcting measures are necessary. In particular, a re-sending of information is omitted and, further, the communication participants are required to raise less effort in regard to the detection and remedy of errors.

According to yet another aspect of the present invention, the adjustment of the direction of communication is carried out depending on the received control command. This provides the advantage that the LED control units can adjust the directions of communication in regard to adjacent data line segments on their own after receipt of the control command. Thus, in accordance with the invention, it is possible to adjust that all LED control units receive exactly one control command and that the data line segment, on which the control command has been received, does not have to be taken into account any further. Here, the direction of the data line segment can be inverted, since, on this data line segment, a return of the execution result is always carried out after the receipt of a control command. Thus, according to the present invention, the direction of communication can be controlled efficiently.

According to yet another aspect of the present invention, the direction of communication describes if one of the paired LED control units executes a reading operation or a writing operation on the data line segment. This provides the advantage that the data line or the data line segment can be blocked in regard to a non-occurring communication. That way, after a reading operation, namely the receipt of the control command, typically a writing operation is carried out, namely the return of the execution result.

According to yet another aspect of the present invention, each of the LED control units inverts the direction of communication of the respective data line segment after the receipt of the transmitted control command on its own. This provides the advantage that no further control logic has to be provided, and that the LED control units can control the adjacent data line segment without any further control. Also, in the command unit, after a transmission of the control command, i.e. after the writing on the adjacent data line segment, it is possible to merely monitor this data line segment. Thereby, it is waited for the return of the execution result.

According to yet another aspect of the present invention, each of the LED control units inverts the direction of communication of the respective data line segment after the return of the execution result on its own. This provides the advantage that, in case an execution result has been returned, a further control command can be expected, and, thus, that the respective data line segment can be monitored.

According to yet another aspect of the present invention, the passing-on of the control command is carried out substantially immediately after its execution in an LED control unit. This provides the advantage that further calculation steps are omitted, which steps might affect the efficiency of the method as proposed herein. Furthermore, the passing-on of the control command is not delayed unnecessarily.

According to yet another aspect of the present invention, the passing-on of the control command is carried out substantially at the same time as its execution in an LED control unit. This provides the advantage that the full processing of the control command does not have to be awaited, but that a passing-on and an execution of the control command are substantially carried out simultaneously in a way such that the control command is already passed on to the next LED control unit while it is processed. Thus, a parallelization is possible in each of the LED control units.

The present object is also achieved by a device for bidirectional communication between a command unit and a plurality of serially and electrically connected LED control units. Therefore, the device comprises a command unit which is configured for transmission of a control command to the connected LED control unit. Further, a plurality of LED control units provided, which is each configured for execution of the transmitted control command in the respective LED control unit and for passing-on of the control command to the next connected LED control unit which has not yet transmitted the control command, in an iterative manner, such that each LED control unit executes the control command, wherein the plurality of LED control units is configured for return of a respective execution result of the control command, starting from the last of the serially connected LED control units to the respective previous unit, wherein each of the plurality of LED control units attaches its execution result to the respective received execution result, in an iterative manner, such that the command unit receives the execution results of each of the control units.

Here, it is particularly advantageous that the proposed method can be implemented by the proposed device. Thus, the proposed device comprises respective structural features which enable an execution of the respective method steps. Thus, the device in accordance with the present invention comprises substantially all features of the method according to the present invention in structural form.

The object is also achieved by a memory module with control commands for execution of a method according to one of the previously described aspects. The memory module can exist as a hardware component, or also as a computer program product on a respective memory medium.

Thus, a specifically efficient and highly performant method for communication between components is proposed.

Figure 2:
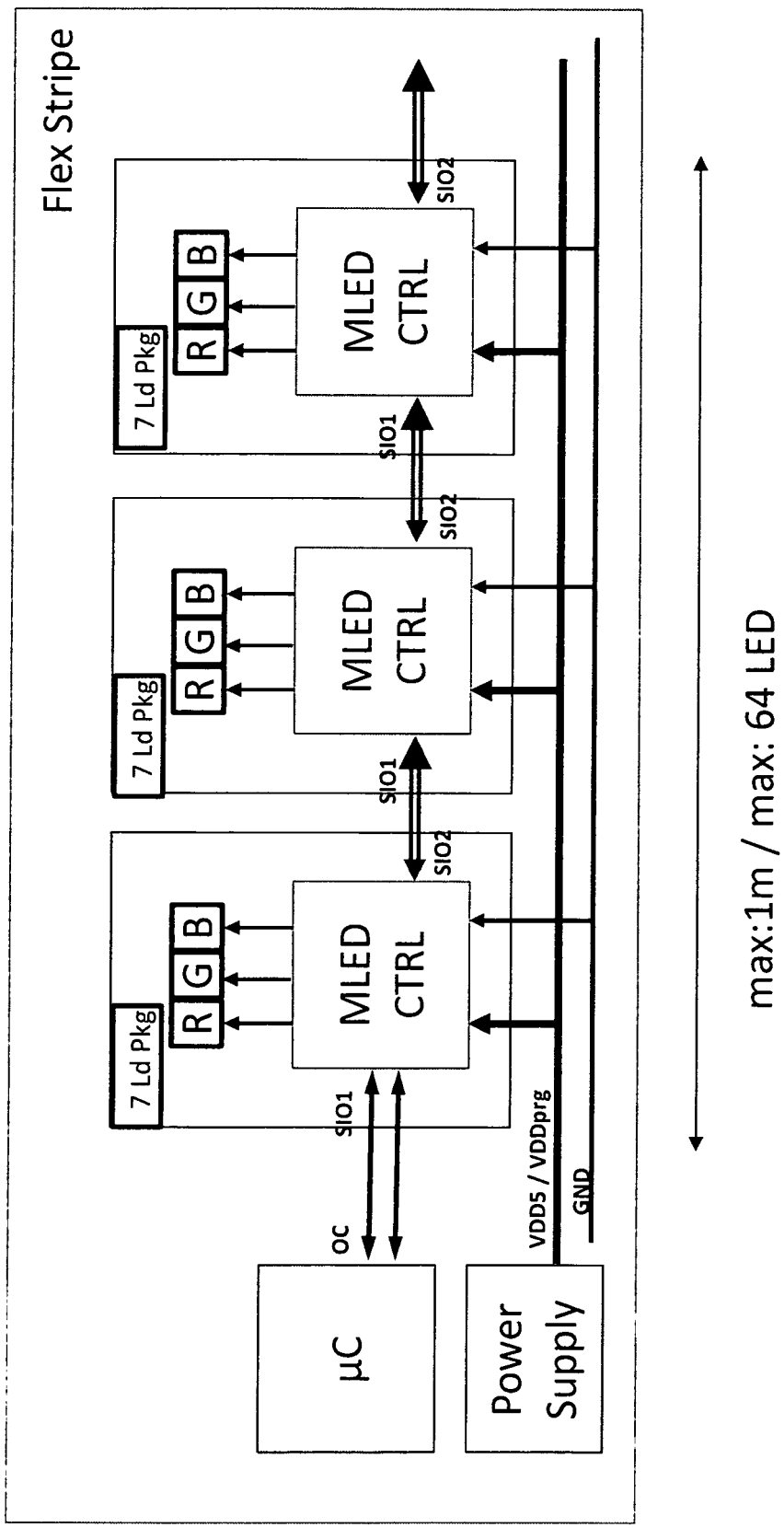
Figure 3:
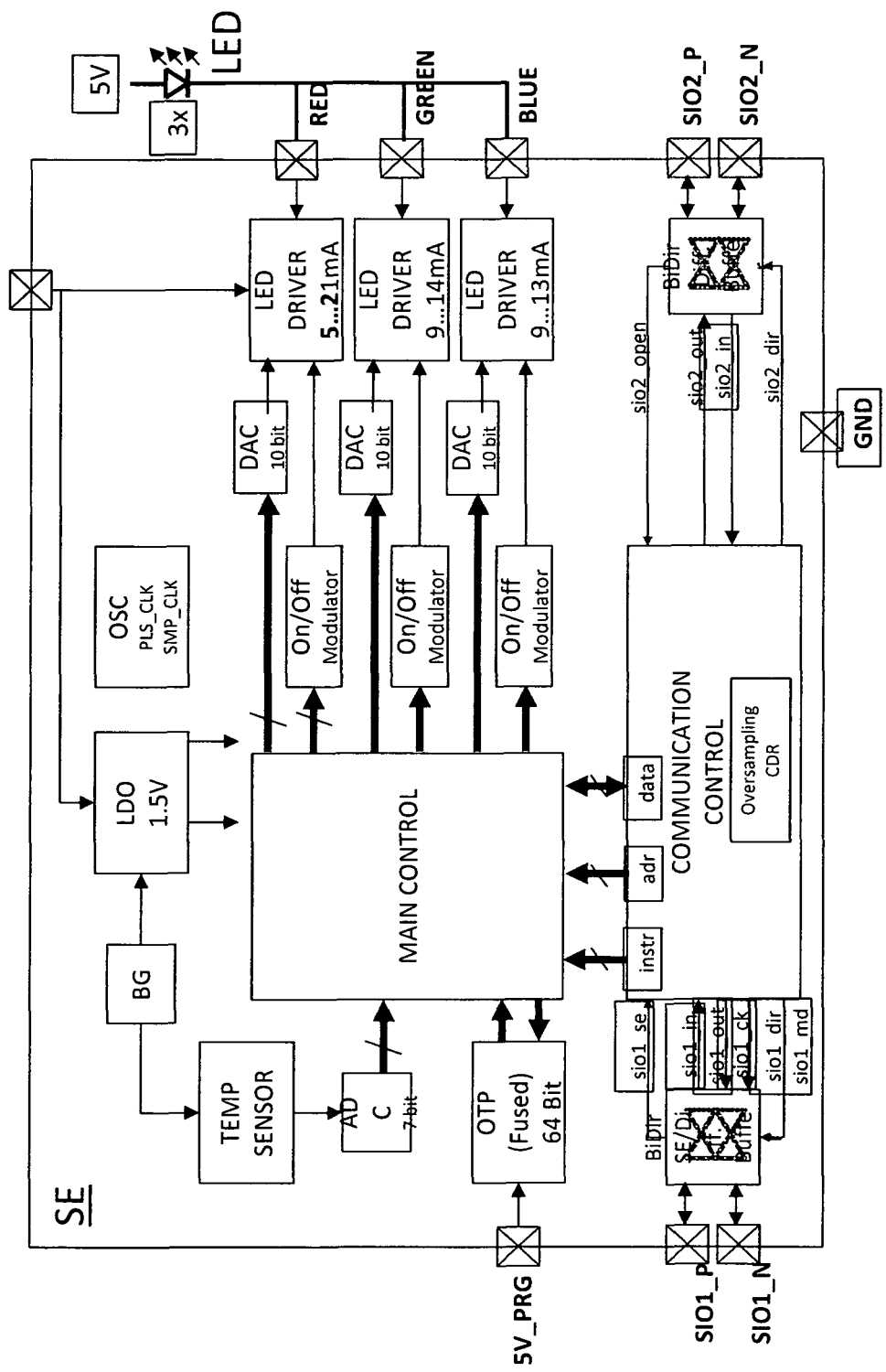
Figure 4:
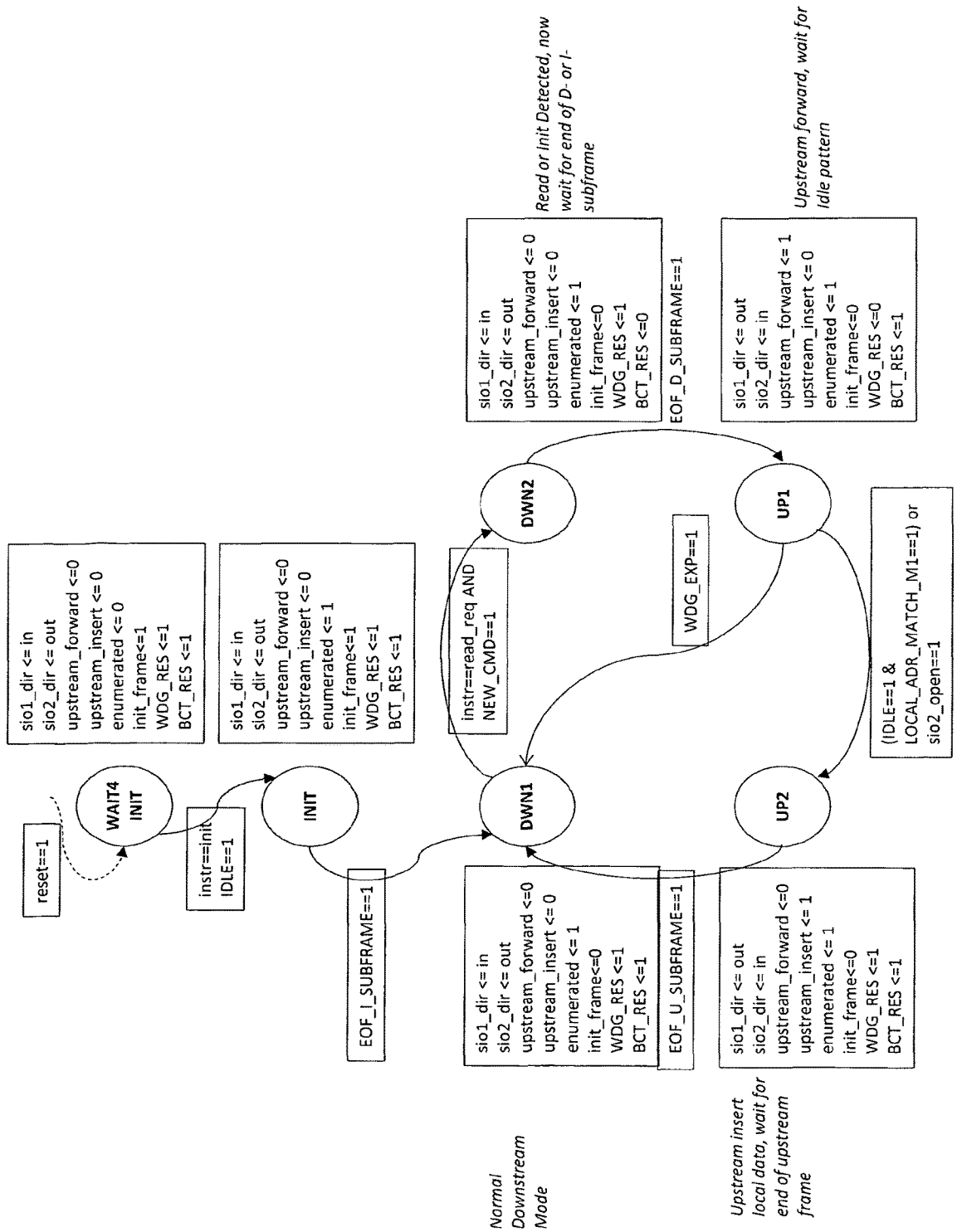

Further advantageous developments are described in the following with reference to the attached figures. It is shown in:

FIG. 1 a schematic block diagram for illustration of the method for bidirectional communication or of the logical progress of a signal sequence of the device for bidirectional communication according to an aspect of the present invention;

FIG. 2 a schematic block diagram for illustration of an aspect of the device for bidirectional communication on a structural level;

FIG. 3 a schematic illustration of an LED control unit in accordance with an aspect of the present invention; and FIG. 4 a schematic state diagram or a flow chart according to an aspect of the method for bidirectional communication according to the present invention.

FIG. 1 shows the device according to the present invention, which device can also be described as a communication arrangement or communication system. In the present aspect, the device according to the invention is shown, which comprises a command unit BE, as well as three control units SE1, SE2, SE3. On the left side of FIG. 1, the command unit is illustrated, which is communicatively connected to a plurality of LED control units. Generally, the present invention is not limited to any number of LED control units but is directed to any number of LED control units. Furthermore, according to the present invention, it is particularly advantageous not only to control LED control units but control units in general. Thus, in accordance with the invention, it is possible to address any control units, but also to address a mixed plurality of control units comprising LED control units, and other control units.

Since the present example is a description of a logical functionality, the data line with its data line segments is sketched in a way such that a first quantity of data line segments S1A, S2A, S3A is sketched in one direction, and a second quantity of data line segments S4B, S5B, S6B is sketched in a second direction, respectively. Here, however, in physical manner, one data line segment can be involved, respectively. Thus, as an example, the data line segments S2A and S5B can exist as one physical data line segment. Also, the data line does not have to exist integrally in one piece but the single data line segments can exist as separate data line segments which provide the data line by mutual interaction.

According to the present aspect, the command unit BE is connected with exactly one control unit SE1, meaning that the control unit SE1 is connected to the command unit BE. Starting at the command unit BE, the control unit SE1 constitutes the next communication partner. Since the single control units SE1, SE2, SE3 are connected in series to the command unit BE, the command unit has exactly one communication partner, namely the control unit SE1. Now, the command unit BE transmits a control command to the first control unit SE1 by means of the logical communication line S1A. The first control unit SE1 receives the command unit and executes the same. Either after execution of the control command or already with receipt of the control command, the control unit SE1 passes the same on to the next control unit SE2 by means of the data line segment S2A to the next control unit SE2. Thus, with respect to the first control unit SE1, the control unit SE2 is the next control unit. This is the case, since the control unit SE1 is the control unit from which the control unit SE2 received the control command. Thus, in the control unit SE1, a passing-on of the control command to the next connected control unit SE2, which unit did not yet transmit the control command, is carried out.

Since the control command at hand has been passed on from the command unit to the first control unit SE1, the control unit SE2 in this method step constitutes the respective communication partner which has not yet transmitted the control command. This is carried out in such an iterative manner that the control units receive the control command successively. That way, the control unit SE2 sends the control command further on to the control unit SE3. In the present example, the control unit SE3 constitutes the last control unit, since the same has only one communication partner. Thus, an execution of the control command is carried out in each of the control units, wherein a passing-on of the control command is only carried out in the control units SE1 and SE2.

In case the control command has reached the control unit SE3 on the right side and all control units have executed the control command, a return of the respective execution result is then carried out. Here, the control unit SE3 starts and transmits its execution result, for example a parameter, to the control unit SE2. The control unit SE2 receives this value, i.e. the execution result of the control unit SE3, and attaches its own execution result to the received execution result. This execution result is transmitted to the control unit SE1, which again attaches its execution result, and the thus combined execution result is transmitted to the command unit BE. That way, the command unit BE receives all execution results of the connected control units. Thus, the respectively received and passed-on execution result can be described as a combined execution result, wherein a combined execution result comprises all execution results of the previous control units.

In the present example, the data line exists in the form of several data line segments. These segments can be adjusted with regard to their direction in such a way that they only allow a unidirectional communication. Thus, in each direction, the full bandwidth is available. While the data line can exist as one physical data line in one integral piece, it is also possible that the same is divided into single data line segments, such that these data line segments provide the data line with their interaction. In the present example, a data line is configured between the command unit BE and the first control unit SE1 in such a way that a data line segment S1A in a first direction is provided, and that a second data line segment S6B in a second direction is provided. That way, it should be clarified that the one physical data line is logically dividable in data segments in regard to one direction, respectively.

Furthermore, it is specifically advantageous that the single control units or the command unit BE is configured in a way such that the direction of communication is adjusted to the data segments or data line segments. For example, the control unit SE2 receives a control command by means of the data line or the data line segment S2A and inverts the transmission direction of the communication line immediately. That way, the data line segment S2A is turned off and the data line segment S5B is turned on. This is the case, since no further receipt of data is expected after the receipt of a control command on one data line segment, but rather that the parameter or the execution result is to be returned. This is carried out in logical direction by means of the data line segment S5B. A switching of the direction of communication can be carried out, for example, in such a way that, on a data line segment which is monitored, it is only possible to send after the complete receipt of a control command on this data line segment in the opposite direction. Thus, the respective data line segment is inverted by its direction immediately after the execution and passing-on of a control command.

For example, the control unit SE3 receives a control command by means of the data line segment S3A, executes this control command without passing it on, and transmits the execution result by means of the data line segment S4B. After the receipt of the execution result by the control unit SE2, the communication direction of the data line between SE2 and SE3 can be inverted again such that the direction of communication S3A now prevails. The control unit SE2 receives the execution result and attaches its own execution result in such a way to the received execution result in a way such that a combined execution result is generated. This execution result is passed on to the control unit SE1 by means of the data line segment S5B.

Thus, the direction of the data line can be adjusted segmentally. For example, if a control command is executed in the control unit SE1, it is possible that the data line segment S6B is activated, and that, in the other direction, the data line segment S2A is activated. That way, the adjustment of the direction of communication is carried out depending on the respective status of processing and passing-on of the control command.

FIG. 2 shows a possible structure of the proposed system or communication arrangement. Thus, on the left side, the command unit BE is shown as a micro controller μC, which, at hand, is connected to three control units. Since the three control units are connected in series, the command unit is directly connected with one control unit and is connected indirectly with two control units. The three control units can be so called Multi-LED controller. In FIG. 2, this is referred to as MLED CTRL. With the consistent use of this reference sign, it is specifically clarified that the control units are all typically configured in the same way. As can be gathered at hand, the light-emitting diodes are RGB (i.e. red, green, blue) light-emitting diodes. These diodes are configured in order to adjust to a certain color value by means of a mixing ration of the single light-emitting diode units. Furthermore, it can be gathered from the present figure that further components are to be provided according to demand. For example, it can be necessary to provide a power supply. Here, it is also possible to provide these components, such as the power supply, externally and merely connect the same thereto.

The present data line is provided as a plurality of data line segments which are referenced by bidirectional arrows SIO1, SIO2.

FIG. 3 shows a control unit SE according to an aspect of the present invention. As can be gathered from FIG. 3, this control unit can also comprise further components. In particular, it can be a control unit which is configured analogously to the control unit MLED CTRL. Hence, there are single light-emitting diode units provided on the right side, which are schematically present as one single light-emitting diode LED. The same emit either red, green or blue light, respectively, and set a certain mixing ratio of these colors in a way such that, altogether, any color can be generated by the LED. An adjustment of the color values can be achieved, for example, by a pulse width modulation PWM. Therefore, further components are to be provided, such as an On/Off-modulator. Here, the skilled practitioner is aware of further components that are to be provided, for example an LED driver. In particular, commonly known components can be used, such as they are shown in FIG. 3. Thus, a respective description is omitted. Here, it is particularly advantageous that the method in accordance with the present invention typically can be carried out by means of commonly known components, wherein the same are merely adapted in a way such that they perform the single method steps. In particular, at this point, the component "Communication Control" is cited, which component is able to carry out the method according to the present invention at least in part.

FIG. 4 shows a technical implementation in regard to single states which can be undergone by the system or the device in accordance with the present invention. For example, it is referred to FIGS. 2 and 3 in such a way that the attribute "sio" is directed to the respective data line segments. That way, the parameter sio1_dir describes a direction of communication, which can be exemplary adjusted to "in" or "out". For example, in FIGS. 1 and 2, a sending process from the left to the right can be adjusted to correspond to a "downstream"-direction, and a transmission of information from the right to the left can be adjusted to correspond to an "upstream"-direction. With reference to the previously described features, the skilled practitioner is in the position to adjust the parameters of FIG. 4. For example, a "1" is typically used for the presence of a certain event, and a "0" is used for the absence of a certain event. When adjusting a direction, it can be proceeded as follows:

In a first state WAIT4INIT, it can be waited for an initializing signal or an initialization. In the case that an instruction instr is an INIT-command and an initialization is then completed, the control unit proceeds to the state INIT. Thus, the direction of communication is switched to "downstream" DWN1. That way, it can be waited in this state, and it can be switched to the state DWN2 depending on the receipt of a control command. Here, the direction of communication is still switched to "in". In case the recently obtained frame has been received and, thus, the direction of communication for a receipt is no longer needed, it can be switched to the so called "upstream" direction UP1. Is the communication direction, thus, switched to "upstream", for example, a standby state UP2 can occur, i.e. a waiting mode, until a result is returned, or it can be switched to the "down" direction DWN1 immediately. Here, in particular, it should be clarified that the single control units adjust the direction on their own, depending on the state of processing of the control command. Therefore, no further communication is needed, since the control units have information about the respective state on their own at their disposal.

Thus, in accordance with the present invention, a method and a device are created, which enable an efficient and performant communication between serially connected units.

The invention claimed is:

1. A method for bidirectional communication between a command unit and a serially and electrically connected plurality of LED control units, the method comprising:
   transmitting a control command as an instruction for all LED control units from the command unit to the first serially connected LED control unit;
   executing the transmitted control command in the LED control unit that has received the control command and immediate passing-on of the unchanged control command to the next connected LED control unit which did not transmit the control command, iteratively in such a way that each LED control unit receives and executes the same control command and the passing-on of the control command is carried out immediately after its reception before execution or at the same time as its execution in an LED control unit, wherein the passing-on is carried out in LED control units unless the LED control unit has only one communication partner and an order is defined in the series in such a way that the transmission of the control command from the command unit to the last LED control unit is carried out by means of the single LED control units; and respectively returning an execution result of the control command, starting from the last serially connected LED control unit to the respective previous unit, wherein each of the plurality of LED control units attaches its execution result to the received execution result in an iterative way such that the command unit receives the execution results of each LED control unit.

2. The method according to claim 1, wherein the execution result comprises at least one return value of a plurality of return values, the plurality comprising: a measurement value, a calculation result and a status information.

3. The method according to claim 1, wherein the control command includes several instructions.

4. The method according to claim 1, wherein the LED control units are connected serially in pairs by means of a respective data line segment of a data line.

5. The method according to claim 1, wherein the data line segments are unidirectional and adjustable in regard to their direction of communication.

6. The method according to claim 1, wherein the adjustment of the direction of communication is carried out depending on the received control command.

7. The method according to claim 4, wherein the direction of communication describes if one of the paired LED control units executes a reading operation or a writing operation on the data line segment.

8. The method according to claim 1, wherein each of the LED control units inverts the direction of communication of the respective data line segment after the receipt of the transmitted control command on its own.

9. The method according to claim 1, wherein each of the LED control units inverts the direction of communication of the respective data line segment after the return of the execution result on its own.

10. A memory module comprising control commands for executing a method according to claim 1.

11. A device for bidirectional communication between a command unit and a plurality of serially and electrically connected LED control units, comprising:

the command unit which is configured for transmission of a control command as an instruction for all LED control units to the first serially connected LED control unit; and the plurality of LED control units, each being configured for execution of the transmitted control command in the respective LED control unit that has received the control command and for immediate passing-on of the unchanged control command to the next connected LED control unit which has not yet transmitted the control command, in an iterative manner, such that each LED control unit receives and executes the same control command and the passing-on of the control command is carried out immediately after its reception before execution or at the same time as its execution in an LED control unit, wherein the passing-on is carried out in LED control units unless the LED control unit has only one communication partner and an order is defined in the series in such a way that the transmission of the control command from the command unit to the last LED control unit is carried out by means of the single LED control units wherein the plurality of LED control units is configured for return of a respective execution result of the control command, starting from the last of the serially connected LED control units to the respective previous unit, wherein each of the plurality of LED control units attaches its execution result to the respective received execution result, in an iterative manner, such that the command unit receives the execution results of each of the control units.

* * * * *